United States Patent Office 2,944,493
Patented July 12, 1960

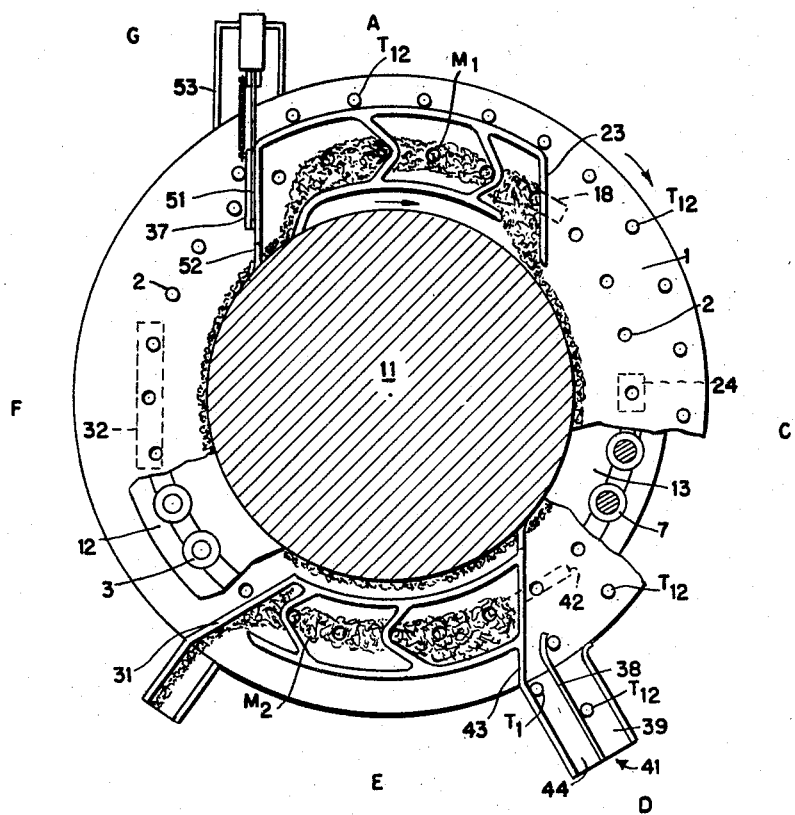
FIG. I

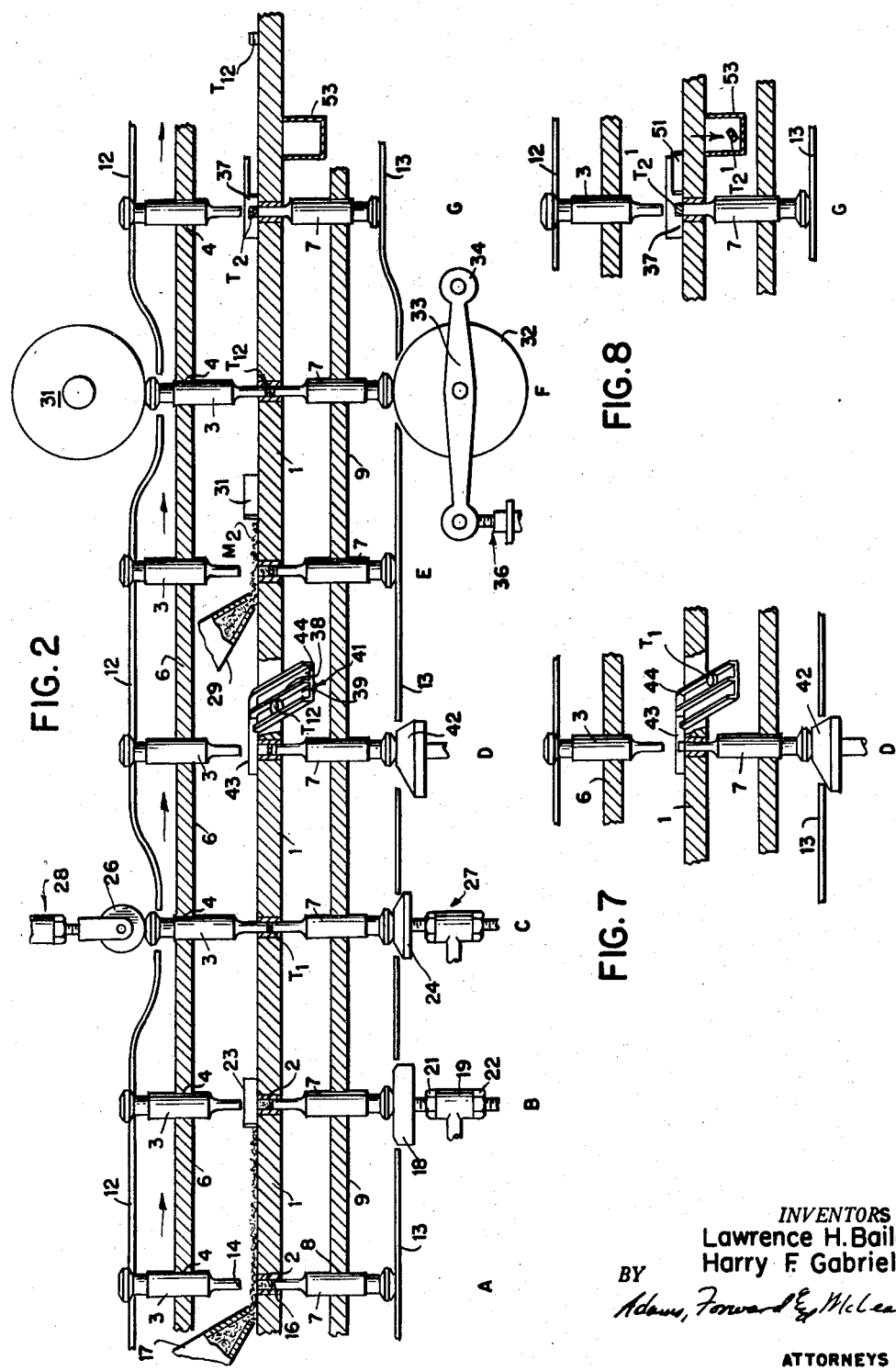

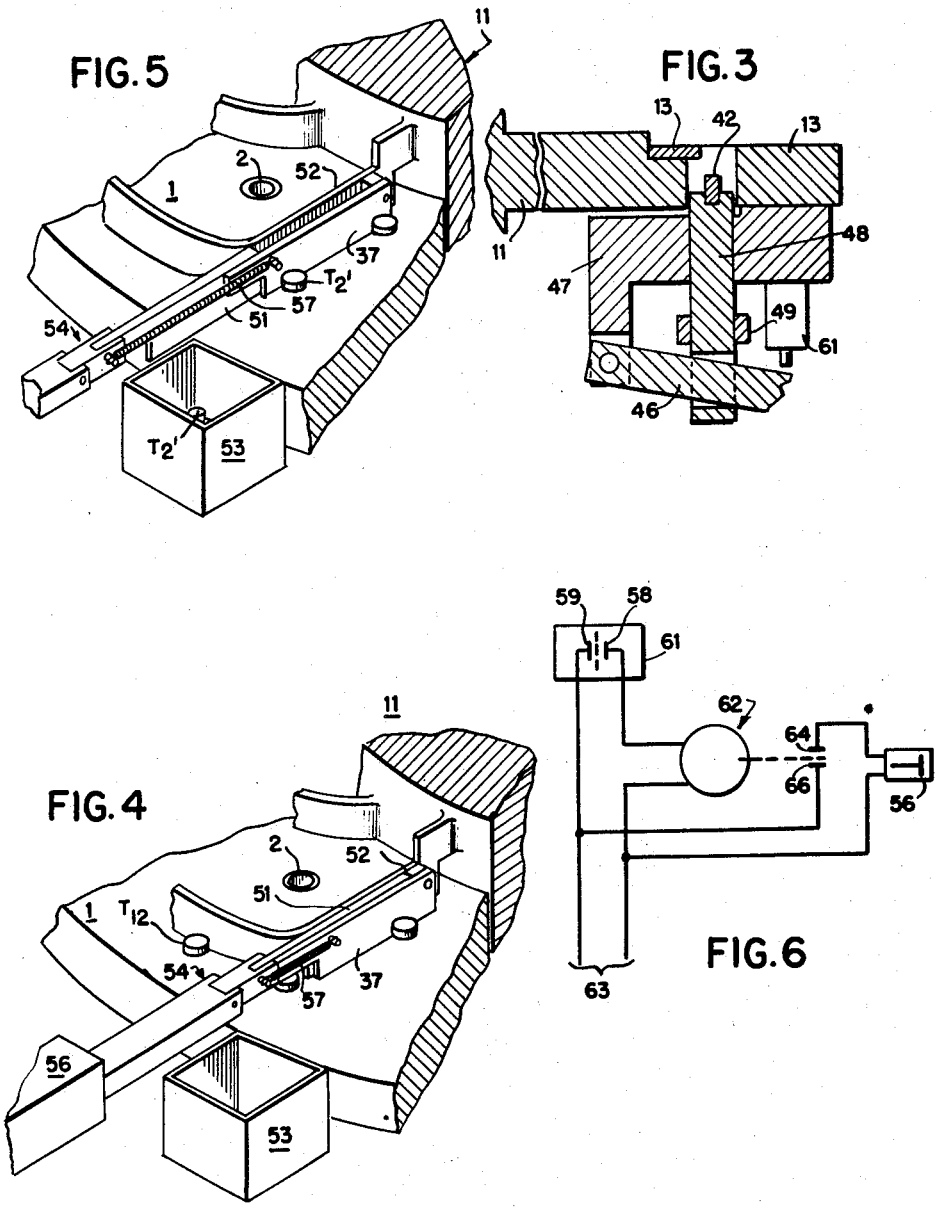

2,944,493

MULTI-LAYER TABLET MANUFACTURE

Lawrence H. Bailey, Rydal, and Harry F. Gabriel, Churchville, Pa., assignors to F. J. Stokes Corporation, Philadelphia, Pa., a corporation of Pennsylvania Filed Nov. 23, 1956, Ser. No. 623,993

5 Claims. (Cl. 107—17)

Our invention relates to tableting pulverant materials such as pharmaceutical compositions, ceramics and powdered metals, and in particular provides a press for producing multi-layer tablets.

In the manufacture of compressed tablets on rotary presses, the production of tablets with two or more layers has long been common practice. In making two-layer tablets, two feeding systems are used and two volumetrically measured quantities of the material or materials to be tableted are placed one at a time in die cavities contained in a rotating die head. An upper and a lower punch is associated with each die cavity and the upper and lower punches compress the material contained in each die cavity and form therefrom a two-layer tablet. For tablets having more than two layers, provision is made for the additional layers just as provision was made for the second layer in making a two-layer tablet. A major shortcoming of this method of tableting is that while the weight of a finished tablet can readily be ascertained, the weight of the individual layers of a tablet cannot be conveniently ascertained. According to one procedure, the weight of individual layers is ascertained by stopping the press and collecting materials for the various layers from the die cavities for weighing. This procedure is not satisfactory as it requires stopping the press. Moreover, stopping and starting the press often results in modification of the weight of the various layers. Another major shortcoming of tableting in the manner described is that considerable intermixing of materials occurs at the interface between layers. This intermixing may in part at least defeat the purpose of assembling the materials in layers as the purpose of such assembly is often to reduce the area of contact between the materials and intermixing at an interface increases the area of contact.

An object of the invention is to provide a multilayer tablet making apparatus characterized in that the weight of each tablet layer can be conveniently ascertained and controlled.

Another object of the invention is to provide a multi-layer tablet making apparatus characterized in that the multi-layer tablets made thereby have well defined interfaces between the various layers.

The method of the invention involves repeatedly making individual multi-layer tablets by steps comprising placing the material to constitute one of the layers in a die cavity, compressing this material and thereby forming a tablet layer, positioning the resulting tablet layer in the die cavity at a selected depth, filling the cavity above the thus positioned tablet layer with material to constitute another tablet layer and compressing this other tablet layer material to form said other tablet layer and cause the layers to cohere together. The steps of positioning a partly formed tablet, filling, and compressing, are repeated until the desired number of layers are built up. The finished tablet is then ejected from the die cavity and guided to a collection point.

As each layer of a tablet formed according to the invention is subjected to a separate compression step, the tablets have well defined interfaces between the various layers.

According to the invention, the weight of material contained in each layer is ascertained by interrupting from time to time the steps of repeatedly making individual tablets and then removing from the die cavity a partially made tablet formed of at least one layer. By weighing the tablet portion or portions removed, the weight of each layer may be determined either directly or by difference. The weight of the first formed or bottom layer can be altered by adjusting the amount of bottom layer material placed in the die cavity. The weight of each of the other layers can be altered by adjusting the position of the tablet portions present in the die cavity just before filling the die cavity with the material to constitute the next layer.

Advantageously, each compression is of sufficient magnitude so that the pulverant material present in the die cavity is compacted to form a self-supporting tablet layer, and, further, so that the tablet layer formed by the compression coheres to the adjoining tablet layer, if any, formed by a previous compression. Operation in such manner results in the tablet parts removed from time to time for weighing being in a form in which they can be handled conveniently.

The tablet press of the invention comprises a die head having a die cavity extending therethrough, a lower punch positioned with the working end thereof in the die cavity and an upper punch positioned above the die cavity. Means are provided for selectively adjusting the level of the working end of the lower punch in the die cavity and for filling the die cavity with tablet material for the first layer above the working end of the lower punch with the working end positioned at a selected level. Thus, the amount of material used to form the first layer can be controlled. Means, conveniently a cam, are provided for forcing the working end of the upper punch into the die cavity to compress tablet material contained therein and form a first tablet layer. Additionally, means are provided for positioning the first tablet layer in the die cavity at a selected level and for then filling the die cavity above the first tablet layer with material to constitute a second tablet layer. Thus, the amount of material used to form the second layer can be controlled. Advantageously, this first tablet layer positioning means is in the form of means for selectively adjusting the positions of the working ends of the upper and lower punches in the die cavity at the end of the compression during which the first tablet layer is formed. Thus, the degree of compression of the first tablet layer and the level of the first tablet layer in the die cavity at the end of the compression can be controlled. For forming the second tablet layer, means are provided for again forcing the working end of the upper punch into the die cavity. Another partially formed tablet positioning, filling and compressing means is provided for each additional tablet layer. Finally an ejection means is provided for ejecting the finished multi-layer tablets from the die cavity.

In order to permit weighing of partially formed tablets (which each consists of a number of layers less than the number of layers in a finished tablet), means are provided for ejecting from time to time from the die cavity the partially formed tablet present therein before the material to constitute the next tablet layer is placed in the die cavity.

The apparatus of the invention is conveniently in the form of a continuously operating rotary press. With such equipment, a complication arises when partially formed tablets are ejected for weighing as the ejections interrupt the normal sequence of press operation, and hence some faulty tablets are produced. According to the invention, provision is made for rejecting these faulty tablets. Thus, a rotary press is constructed so that when the means for ejecting partially formed tablets is actuated, a guide directs faulty tablets from the collection point where finished tablets are directed. In order to insure separation of all faulty tablets, the guide is kept in place a few seconds after operation of the partially formed tablet ejection means is stopped.

For a more complete understanding of the practical application of the principles of our invention, reference is made to the appended drawings in which:

Figure 1 is a plan view of the rotary multi-layer-tablet press shown partly broken away and with the upper punches and other super-structure removed;

Figure 2 is a development of the press shown in part in Figure 1;

Figure 3 is a fragmentary vertical section of a portion of the press shown in Figure 1;

Figure 4 is a fragmentary isometric view of another portion of the press shown in Figure 1;

Figure 5 is a fragmentary view similar to Figure 4 illustrating with reference to Figure 4 the operation of the mechanism shown in Figure 4;

Figure 6 is a schematic diagram of a control circuit employed in the press shown in the drawings;

Figure 7 and Figure 8 are portions of the development shown in Figure 2 illustrating an altered manner of operation.

Referring to the drawings, the rotary multi-layer tablet press there shown is adapted to make two-layer tablets and comprises a die head 1 having vertical die cavities 2 extending therethrough. Upper punches 3 are disposed above the die head. Each upper punch is vertically aligned with a die cavity and extends through a passageway 4 in upper punch guide plate 6. The punches are free to move vertically in the guide plate passageways. Lower punches 7 are disposed beneath the die head. Each lower punch is likewise vertically aligned with a die cavity and extends through a passageway 8 in lower punch guide plate 9 in which the lower punches are free to move vertically. The die head 1, and punch guide plates 6 and 9 are permanently secured together and rotate together carrying the punches with them about the pedestal 11. Any suitable drive means may be used for this service.

An upper cam track 12 and a lower cam track 13 are mounted, respectively, above and below the upper and lower punches, and are fixedly secured to the pedestal 11. The upper cam track causes the upper punch working ends 14 to vertically reciprocate into and out of the die cavities and the lower cam track causes the lower punch working ends 16 to vertically reciprocate up and down in the die cavities.

The upper and lower cam tracks complement each other so that for each revolution of a die cavity and the upper and lower punches associated therewith, a sequence of operations is performed whereby a two-layer tablet is formed. Referring to the reference letters of Figure 1 and Figure 2, at first tablet material receiving position A, pulverant material $M_1$ is delivered to the die head 1 from feed hopper 17 which is secured to the pedestal 11. At this position, upper punch 3 is raised and lower punch 7 is extended partway into die cavity 2, and material $M_1$ falls by gravity into the die cavity.

Position B is a weight adjustment position. Here the volume of material, and hence the weight, to constitute the first layer is controlled. At this position, the lower cam track comprises a selectively vertically adjustable cam 18. The adjustable cam 18 is mounted in bracket 19 which is secured to the pedestal 11. Adjustment is made manually by operation of the lock nuts 21 and 22 to obtain the desired level of the working end of the lower punch in the die cavity. As the lower punch rides over adjustable cam 18, it passes under wiper blade 23 which rests slidably on the upper surface of the die head and wipes therefrom tablet material outside the die cavity. Thus as the die cavity leaves position B it is filled with first layer tablet material above the working end of the lower punch.

At position C, the first layer tablet material is lightly compressed to form therefrom a self-supporting first tablet layer $T_1$. Both the upper and lower cam track at this position comprise a selectively vertically adjustable cam. Adjustable cam 24 in the lower cam track is in the form of a cam surface and adjustable cam 26 is in the form of a pressure roll. Cam 24 and cam 26 are mounted in adjustable brackets 27 and 28, respectively. These cams are adjusted so that at the end of the compression, the desired degree of compression will be attained and the tablet layer $T_1$ will be at such a level in the die cavity that the space in the die cavity over tablet layer $T_1$ equals the volume of pulverant material $M_2$ to be used to form the second tablet layer $T_2$. As the die cavity leaves position C, the lower punch slides off cam 24 and drops a short distance. This does not affect the position of the tablet layer $T_1$ in the die cavity, however, as the vertical surfaces of the tablet layer adhere to the die cavity walls and hold the tablet in place.

Position D is a selectably operable ejection position. During normal press operation, tablet layer $T_1$ passes through this position without incident and then on to position E which is a second tablet material receiving position.

At position E, lower punch 7 is extended partway into the die cavity, pulverant material $M_2$ is delivered from feed hopper 29 to the die head and from there falls into the die cavity. A wiper blade 31, secured to the pedestal 11, rests slidably on the upper surface of the die head and removes therefrom material $M_2$ as the die head moves away from position E.

From position E, the die cavity and associated punches move on to second compression position F. Here, the upper cam track 12 and lower cam track 13 comprise pressure roll 31 and pressure roll 32, respectively. These pressure rolls force the working ends of their associated punches into the die cavity to heavily compress the material contained therein, and thus form tablet layer $T_2$ from material $M_2$ and compress tablet layers $T_1$ and $T_2$ together so that they cohere and form multi-layer tablet $T_{12}$. Pressure roll 31 is mounted at a fixed elevation on the pedestal 11. Pressure roll 32 is vertically adjustably mounted on the pedestal, the horizontal axis thereof being mounted on lever arm 33 which is pivotally connected to the pedestal at 34 and is positioned by operation of hand wheel 36. Thus, the degree of compression at position F may be selectively controlled by vertically adjusting pressure roll 32.

From position F, the die cavity moves on to continuously operating ejection position G. Here upper cam track 12 raises the upper punch 3 above the die cavity and lower cam track 13 raises the lower punch 7 so that tablet $T_{12}$ is ejected from the die cavity. A guide plate 37 secured to the pedestal 11 extends across the upper surface of the die head and guides the tablet $T_{12}$ to the outer portion of the die head (Figure 1). Tablet $T_{12}$ is then carried around on the die head to position D where it contacts guide plate 38. Giude plate 38 guides tablet $T_{12}$ off the die head into the chute 39 which dedeposits the tablet at collection point 41.

When it is desired to determine the weights of tablet layers $T_1$ and $T_2$, tablet layer $T_1$ is ejected from the press at selectively operable ejection position D and weighed, tablet $T_{12}$ is weighed and the weight of tablet layer $T_2$ is determined by difference.

At selectively operable ejection position D, lower cam track 13 comprises a manually operated cam 42 which when raised (Figure 7) ejects tablet layer $T_1$ from the die cavity. Guide plate 43 which is secured to the pedestal 11 intercepts the path of ejected tablet layer $T_1$ and directs tablet layer $T_1$ off the die head into chute 44.

Figure 3 is a radial vertical section through manually operated cam 42. Referring to this figure, a manually operated lever arm 46 is pivotally connected to bracket 47 mounted on lower cam track 13 which in turn is secured to pedestal 11. The lever arm 46 operates the cam support rod 48, and hence the cam 42. A stop 49 is mounted on support rod 48 to limit the travel of cam 42.

By means of manually operated cam 42, without stopping the press tablet layer $T_1$ can be ejected. However, as ejection of layer $T_1$ leaves the die cavity empty as it approaches the second tablet material receiving position E, a faulty tablet $T_2'$ (Figure 8) consisting of a single layer of material $M_2$ will be ejected at continuously operating ejection position G. To preclude commingling of tablets $T_{12}$ and faulty tablets $T_2'$, means responsive to actuation of manually operated ejection cam 42 are provided to direct faulty tablets $T_2'$ away from collection point 41 where tablets $T_{12}$ are collected.

As shown in the drawings, faulty tablets are directed away from collection point 41 by operation of gate plate 51 (Figure 8) which is located at continuously operating ejection position G and which, when in operation, blocks the path of tablets $T_{12}$ along the outer portion of the die head. Figure 4 shows the position of the guides at position G during normal operation and Figure 5 shows the position of the same guides when arranged to direct faulty tablets away from the collection point for tablets $T_{12}$. During normal operation guide plate 37 secured to bracket 52 which in turn is secured to pedestal 11, directs tablets $T_{12}$ from the path of travel of the die cavities to the outer portion of the die head where the tablets leave the guide and are then carried on the die head around to position D where they are removed from the die head and deposited at collection point 41. When the guides are arranged to direct tablets away from collection point 41, see Figure 5, guide plate 37 is in the same position as in Figure 4. Gate plate 51, however, extends across the outer portion of the die head and directs tablets from guide plate 37 to the edge of the die head from where they fall into container 53. Gate plate 51 is connected by linkage 54 to solenoid 56. During normal operation, spring 57 holds gate plate 51 between guide plate 37 and bracket 52 as is shown in Figure 4. When the solenoid is energized, gate plate 51 is drawn into the closed position as is shown in Figure 5.

After ejection of tablet layers $T_1$ at position C is terminated, there will be a few seconds delay before tablets $T_{12}$ begin to be ejected at position G. Hence, the means rendering operation of gate plate 51 responsive to operation of the manually operated cam 42, include time delay means which holds gate plate 51 closed after ejection of tablet layers $T_1$ is terminated and until tablets $T_{12}$ begin to be ejected at position G. The means coordinating operation of the manually operated ejection cam 42 and gate plate 51 are shown in Figure 3 and Figure 6. As is shown in these figures, operation of manually operated cam 42 to eject tablet layer $T_1$ closes the contacts 58 and 59 of micro switch 61. These contacts are connected in series with a time delay relay 62 across a suitable source 63 of electric power. Relay 62 has its contacts 64 and 66, which are normally open, connected in series across the same source of electric power with the coil of solenoid 56, and has an operating characteristic of closing contacts 64 and 66 substantially instantaneously upon energization but of delaying their re-opening for several seconds after de-energization. Thus, when lever 46 is raised to actuate manually operated ejection cam 42, gate plate 51 is instantaneously closed (Figure 5) and it remains closed for several seconds after lever 46 is released to terminate ejection of tablet layers $T_1$.

We claim:

1. A rotary multi-layer tablet press which comprises a die head having vertical die cavities extending therethrough, an upper punch disposed above and vertically aligned with each die cavity, an upper cam track mounted above said die head to vertically reciprocate the upper punches moving the working ends thereof into and out of the die cavities, a lower punch disposed below and vertically aligned with each die cavity, a lower cam track mounted below said die head to vertically reciprocate the lower punches moving the working ends thereof up and down in the die cavities, means for rotating together the die head and upper and lower punches relative to the cam tracks, said cam tracks complementing each other to continuously carry each die cavity and the upper and lower punch associated therewith in sequence through a first tablet material receiving position where the upper punch is raised above said die cavity and the lower punch is extended partway into the die cavity and means are provided for delivering tablet material to the die cavity, a weight adjustment position where the lower cam track comprises a selectively vertically adjustable cam and a wiper blade is disposed above this cam slidably resting on the upper surface of the die head to wipe therefrom tablet material outside the die cavity, a compression position where the upper and lower punch is extended into the die cavity and the upper and lower cam track each comprise a selectively vertically adjustable cam, a selectably operable ejection position where the lower cam track comprises a vertically movable cam selectively operable to eject from the die cavity tablet material contained therein, a second tablet material receiving position where the upper punch is raised above the die cavity and the lower punch is extended partway into the die cavity and means are provided for delivering tablet material to the die cavity, a second compression position where the upper and lower punch is extended into the die cavity, and a continuously operating ejection position where the upper punch is raised above the die cavity and the lower punch is extended into the die cavity to eject tablets contained therein, means are provided to direct the ejected tablets to a collection point and there is provided means responsive to actuation of the selectively operable ejection cam to direct ejected tablets away from said collection point.

2. A rotary tablet press according to claim 1 in which the means responsive to actuation of the selectively operable ejection cam to direct ejected tablets away from the collection point comprises a gate reciprocable on the upper surface of the die head.

3. A rotary multi-layer tablet press which comprises a die head having a vertical die cavity extending therethrough, an upper punch disposed above and vertically aligned with said die cavity for vertical reciprocation moving the working end thereof into and out of said die cavity, a lower punch disposed below and vertically aligned with said die cavity for vertical reciprocation moving the working end thereof up and down in said die cavity, means for rotating said die head and upper and lower punches together to carry said cavity and punches through a series of positions including in sequence a first tablet material receiving position, a first compression position, a second tablet material receiving position, a second compression position and ejection position; said press further including at said first material receiving position means cooperating with said upper punch to position said upper punch above said die cavity, means cooperating with said lower punch to position said lower punch extended partly into said die cavity, and means for delivering tablet material to said die cavity; said press further including at said first compression position means cooperating with said upper punch to extend said upper punch into said die cavity to a selectively vertically adjustable position, and means cooperating with said lower punch to extend said lower punch in said die cavity to a selectively vertically adjustable position; said press further including at said second tablet material receiving position means cooperating with said upper punch to position said upper punch above said die cavity, means cooperating with said lower punch to position said lower punch partly in said die cavity, and means for delivering tablet material to said die cavity; said press further including at said second compression position means cooperating with said upper punch to extend said upper punch partly into said die cavity, and means cooperating with said lower punch to extend said lower punch in said die cavity; and said press further including at said ejection position means cooperating with said upper punch to raise said upper punch above said die cavity, means cooperating with said lower punch to extend said lower punch fully into said die cavity and tablet collection means positioned above said die head.

4. A rotary tablet press according to claim 3 in which said series of positions further includes a selectively operable ejection position located in said sequence between said first compression position and said second tablet material receiving position; said press at said selectively operable ejection position further including means cooperating with said upper punch to raise said upper punch above said die cavity, means selectively operable in engagement with said lower punch to position said punch fully extended into said die cavity whereby tablet material contained therein is ejected therefrom.

5. A rotary multi-layer tablet press which comprises a die head having a vertical die cavity extending therethrough, an upper punch disposed above and vertically aligned with said die cavity for vertical reciprocation moving the working end thereof into and out of said die cavity, a lower punch disposed below and vertically aligned with said die cavity for vertical reciprocation moving the working end thereof up and down in said die cavity, means for rotating said die head and upper and lower punches together through a series of positions including in sequence a first tablet material receiving position, a first compression position, a second tablet material receiving position, a second compression position and an ejection position, a cam track mounted below said die head on which said lower punch rides to set the position of the working end of said lower punch in said die cavity, a portion of said cam track extending along the path of said lower punch between said first compression position and said second tablet material receiving position, and having an opening in said portion of said track, a vertically movable cam having an upper surface for engaging said lower punch, the upper surface of said cam being upwardly inclined from each end and having a flat central surface interconnecting the inclined end surfaces, said movable cam being positioned in said opening with the inclined end portions of said cam aligned with the path of movement of said lower punch along said cam track, said cam having a normal position in which said flat surface is aligned with the guiding surfaces of said cam track portion adjacent said opening, and means for moving said cam upwardly to a position in which said inclined surfaces extend above the surfaces of said cam track portion adjacent said opening.

References Cited in the file of this patent

UNITED STATES PATENTS

| | | |
|---|---|---|
| 342,624 | Michaelis | May 25, 1886 |
| 701,438 | Whyte | June 3, 1902 |
| 785,402 | Buckley | Mar. 21, 1905 |
| 1,248,571 | Stokes | Dec. 4, 1917 |
| 2,166,192 | Whittemore | July 18, 1939 |
| 2,748,424 | Fay | June 5, 1956 |
| 2,795,199 | White | June 11, 1957 |